No. 864,680. PATENTED AUG. 27, 1907.
T. NEVILLE & H. A. THAYER.
AUTOMOBILE TRUCK.
APPLICATION FILED JAN. 22, 1907.

2 SHEETS—SHEET 2.

Witnesses
Inventors
Thomas Neville and
Harry A. Thayer
By Mason Fenwick Lawrence
Attorneys

UNITED STATES PATENT OFFICE.

THOMAS NEVILLE AND HARRY A. THAYER, OF OSHKOSH, WISCONSIN.

AUTOMOBILE-TRUCK.

No. 864,680.　　　　Specification of Letters Patent.　　　　Patented Aug. 27, 1907.

Application filed January 22, 1907. Serial No. 353,538.

*To all whom it may concern:*

Be it known that we, THOMAS NEVILLE and HARRY A. THAYER, citizens of the United States, residing at Oshkosh, in the county of Winnebago and State of Wisconsin, have invented certain new and useful Improvements in Automobile-Trucks, of which the following is a specification.

Our invention relates to automobile trucks and is adapted to be used in connection with an elevator.

Our invention is designed to facilitate the moving and repairing of an automobile within a garage.

The object of our invention is to provide a truck that may be conveniently latched to an elevator.

A further object of our invention is to provide a truck that will safely and conveniently receive the automobile from the elevator.

A further object of our newly invented truck is to provide a means for transporting an automobile in a garage in any direction at a suitable elevation from the floor.

A further object of our invention is to provide a truck of skeleton construction adapted to support an automobile at a proper elevation for the purpose of repairs.

Figure 1:
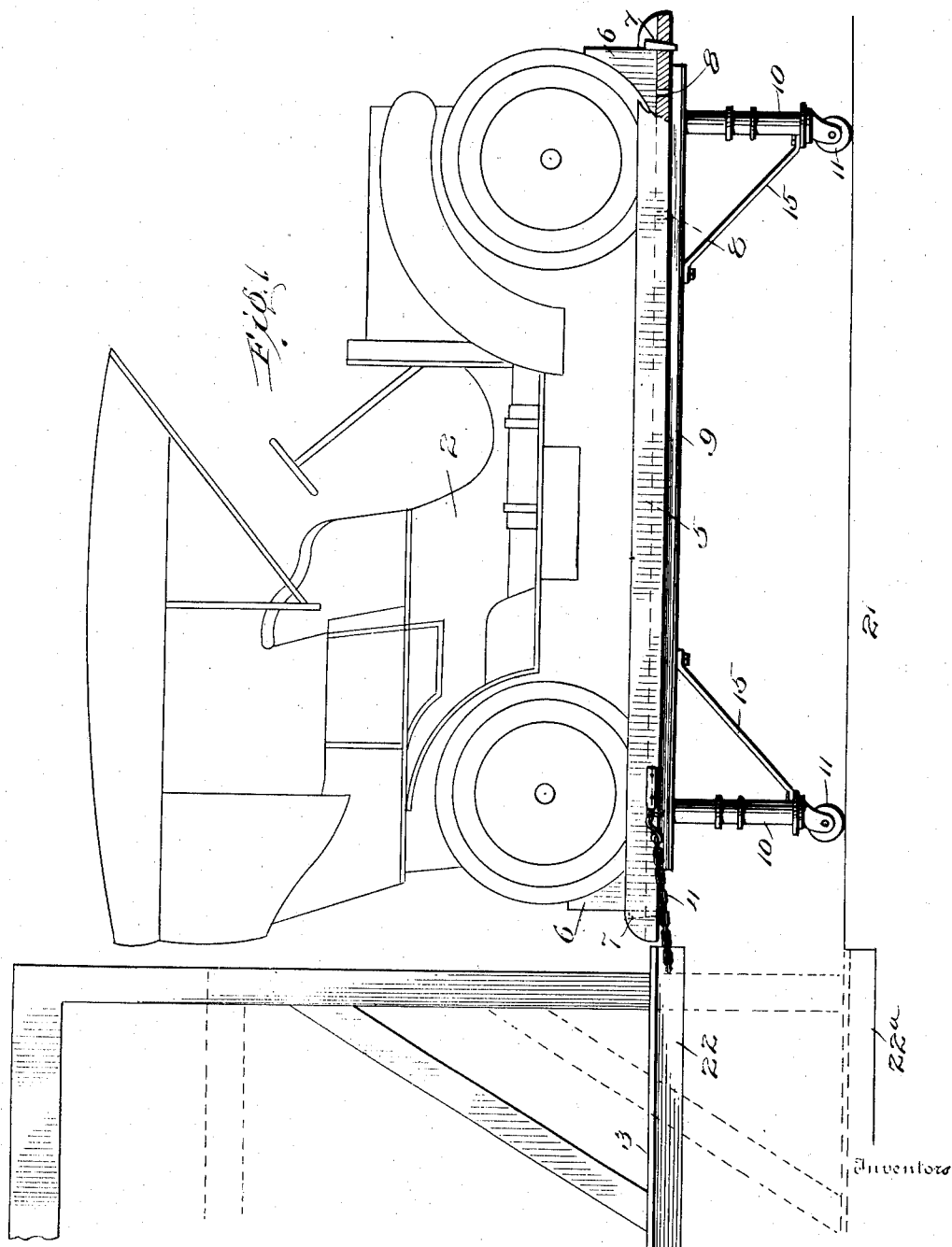
Figure 2:
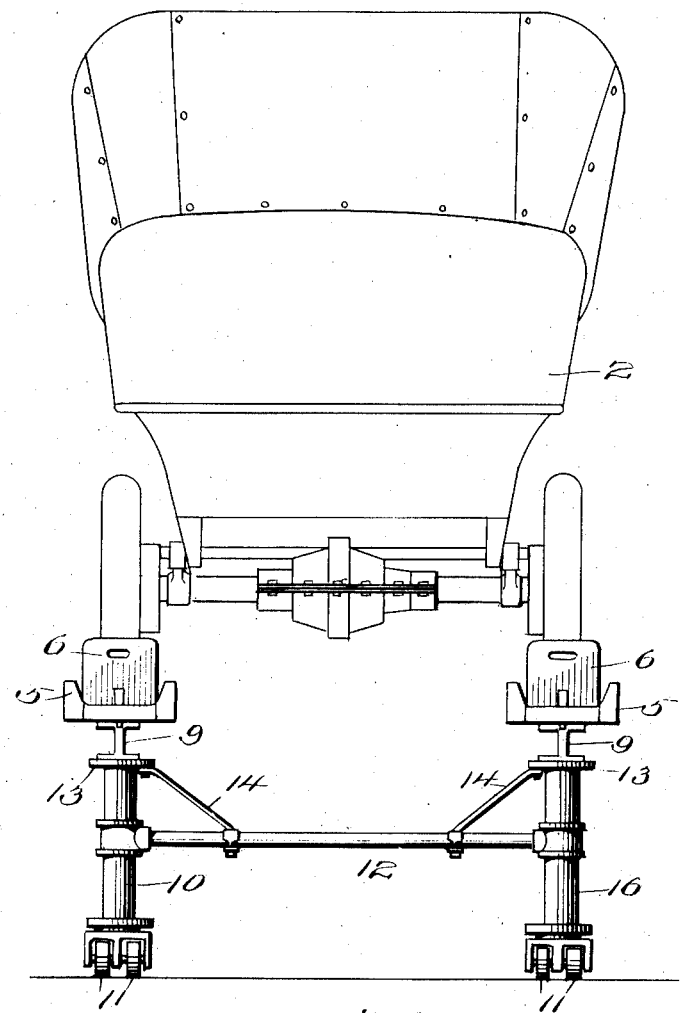

In the accompanying drawing Figure 1 represents a side view of our invention. Fig. 2 represents an end view of the same.

In the use of our invention the automobile is first run upon the elevator, elevated to the proper height to correspond with the height of the truck, and then rolled from the elevator onto the truck.

Referring to the drawings by numerals, 2 represents the automobile and 3 the floor of the elevator.

4 represents a chain and latch adapted to latch the truck to the elevator before rolling the automobile from the elevator floor.

5—5 represents troughs upon each side of the truck in which the automobile wheels travel.

6, 6, 6, 6 represent chuck-blocks adjustable by means of pins 7, 7 etc. adapted to pass into openings 8, 8, 8 etc. in the bottoms of the troughs 5—5.

In the construction of the truck a minimum skeleton construction is provided so that the automobile may be repaired underneath without interference.

9, 9 represent angle-iron side-beams underneath the troughs 5, 5.

10, 10 10, 10, represent the legs, and 11, 11, 11, 11 revoluble casters. It will be observed that the end-beams 12, 12 are dropped below the horizontal line of the side-beams and braced to the connecting plates 13, 13 etc. by means of the braces 14, 14, etc. It will be readily understood by reference to Fig. 2 of the drawings that such construction gives ample room for the making of repairs underneath the automobile. The legs are also braced to the side-rails by means of the braces 15, 15 etc.

Heretofore it has been usual to run the automobile upon a track over a pit and make repairs from beneath and from within the pit. Our invention provides a new and improved method of locating the automobile in a new and improved manner for making repairs.

What we claim is:—

In a device of the class described, a wheeled frame, spaced treads mounted upon the frame, and provided with spaced openings, spaced side pieces upstanding from opposite edges of the treads, chuck blocks proportioned to be disposed upon the tread and between the side pieces, and pins insertible through the openings in the tread and to prevent displacement of the chuck blocks.

In testimony whereof we have signed our names to this specification in the presence of two subscribing witnesses.

THOMAS NEVILLE.
HARRY A. THAYER.

Witnesses:
 A. R. WATERHOUSE,
 W. W. WATERHOUSE.